Figure 1:
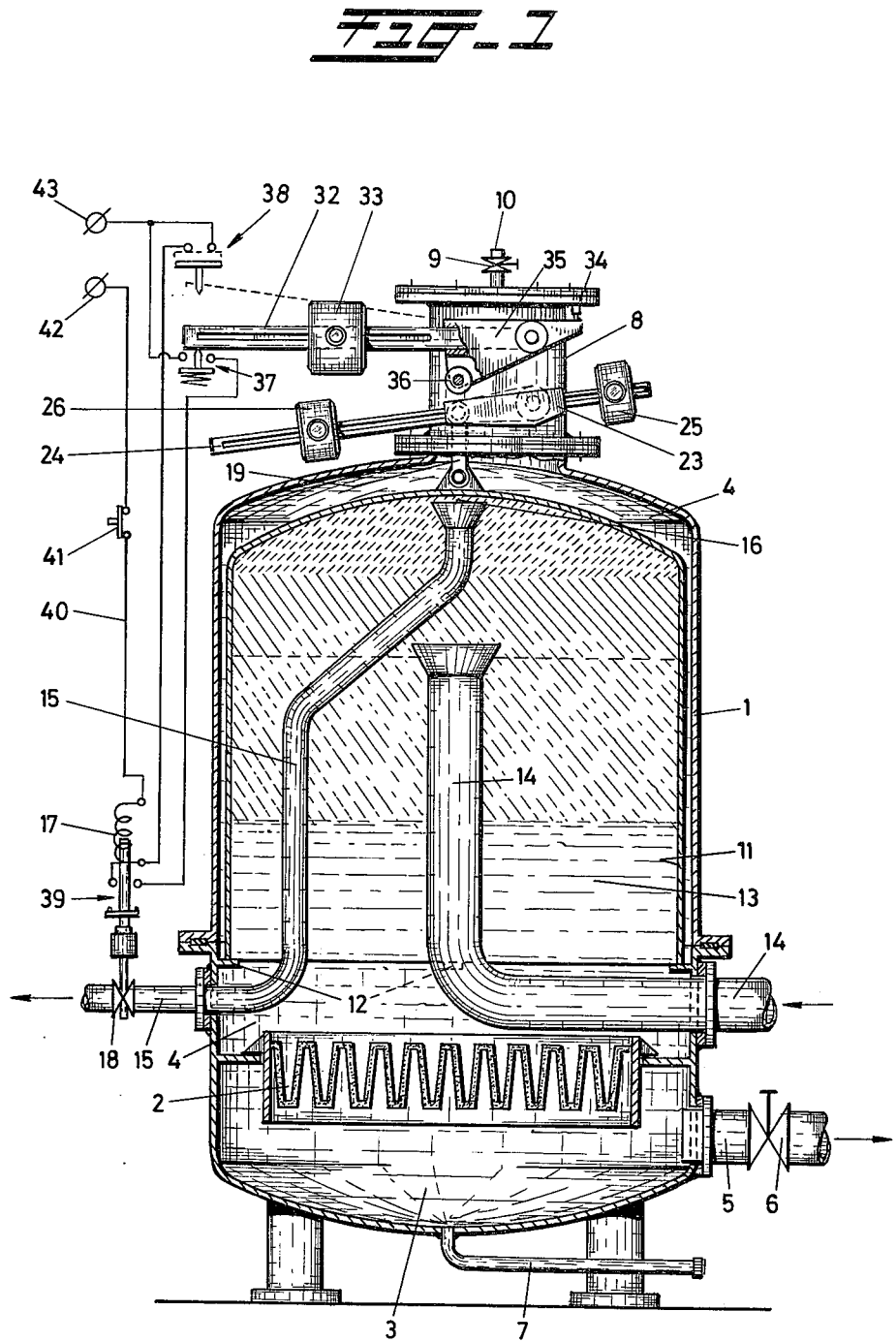

United States Patent [19]
in't Veld

[11] 3,957,638
[45] May 18, 1976

[54] APPARATUSES FOR THE SEPARATION OF A LIGHTER LIQUID FROM A MIXTURE OF A HEAVIER AND A LIGHTER LIQUID

[75] Inventor: Cornelis in't Veld, Vlaardingen, Netherlands

[73] Assignee: National Marine Service, Incorporated, St. Louis, Mo.

[22] Filed: Nov. 26, 1974

[21] Appl. No.: 527,277

[52] U.S. Cl. ............................. 210/104; 210/109; 210/123; 210/540
[51] Int. Cl.² ........................................ B01D 21/24
[58] Field of Search .......... 210/104, 109, 115, 123, 210/540

[56] References Cited
UNITED STATES PATENTS

| | | | |
|---|---|---|---|
| 815,407 | 3/1906 | Cooper | 210/109 X |
| 3,424,311 | 1/1969 | Siedenburg | 210/109 X |
| 3,481,469 | 12/1969 | Walker | 210/115 X |
| 3,868,321 | 2/1975 | Gough | 210/115 X |

*Primary Examiner*—John Adee
*Attorney, Agent, or Firm*—Bacon & Thomas

[57] ABSTRACT

A counterbalance and control system for a gravitational oil and water separator using a floating inverted bell comprises a linkage, sealed coupling shaft and weight system for controlling an outlet valve for the separated oil accumulated beneath the bell during operation of the separator. The linkage and shaft system transmits motion of the bell in response to accumulated oil in a fluid-tight manner to the control system, which is located exteriorly of the separator vessel. Counter-weight masses are connected to the bell through the linkage and shaft system to enable the control system to respond to the accumulation of a predetermined weight of oil beneath the bell.

6 Claims, 3 Drawing Figures

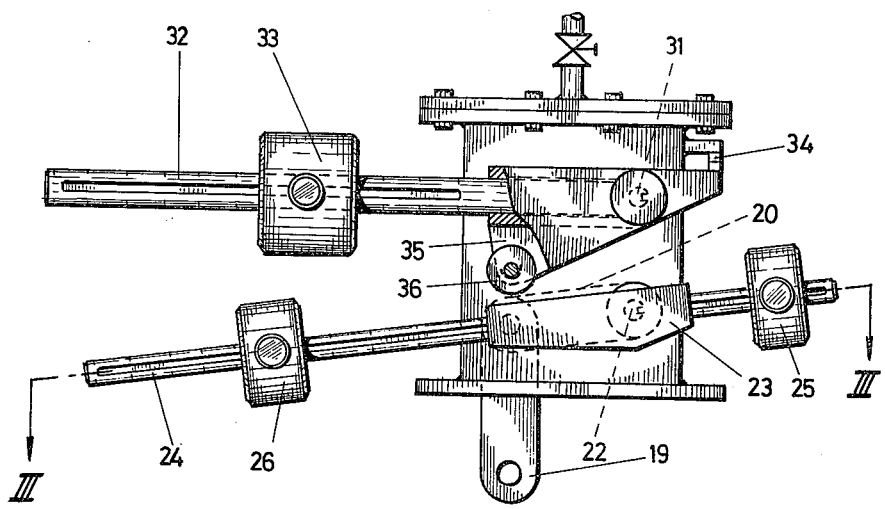
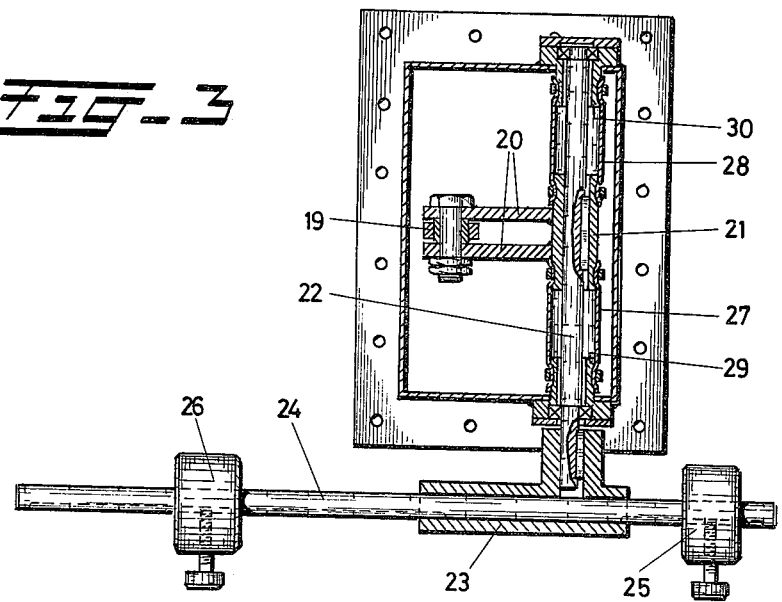

APPARATUSES FOR THE SEPARATION OF A LIGHTER LIQUID FROM A MIXTURE OF A HEAVIER AND A LIGHTER LIQUID

The invention relates to an apparatus for the separation of a heavier liquid and a lighter liquid from a mixture of the same. According to the invention, said apparatus comprises at least a vessel, a venting member associated with said vessel, a bell mounted for vertical movement between a lowest and a highest position in said vessel, a filter adapted to let through heavier liquid only, said filter dividing the vessel into a chamber containing the bell and a heavier liquid discharge chamber, a conduit for the supply of mixture to be separated, said conduit opening into the separation space within the bell, lighter liquid discharge conduit connected to said separation space, the inlet opening of said discharge conduit lying just below the upperwall of the bell, when it is in its lowest position, a heavier liquid discharge conduit connected to the heavier liquid discharge chamber and a control system for controlling the lighter liquid discharge, said control system being mounted outside the vessel and being coupled with the bell by means of a mechanical coupling member which extends through the wall of the vessel in a gas and liquid tight manner.

In said apparatus the coupling member is a shaft which is rotatably supported by and extends through the wall of the vessel, said shaft being, within said vessel, positively coupled with the bell and for at least a portion of its length surrounded by a twistable hose of gas and liquid tight material, of which one end is slipped in a gas and liquid tight manner over the or a bearing bushing projecting into the vessel and attached in a gas and liquid tight manner to the wall of the vessel and the other end is slipped in a gas and liquid tight manner over a portion of the shaft or over a sleeve provided on the shaft. The outwards projecting end portion of the rotatable coupling shaft which is positively coupled with the bell, can be used in a simple manner for controlling the valve in the oil discharge conduit, for compensating the apparent weight of the bell in water, for loading the bell with a weight to be adjusted in correspondence with the specific weight of the mixture to be separated and for adapting the control to the specific weight of the lighter liquid to be separated and to the range, in which the thickness of the layer of lighter liquid which is formed in the bell is allowed to vary.

In order to make the coupling shaft rotate as easily as possible that means to make the regulation as sensitive as possible a construction is recommended, in which the coupling shaft is rotatably supported by two opposite wall portions of the vessel and carries in a region between its bearings a sleeve which is attached to the shaft and positively coupled with the bell, said coupling shaft being surrounded between each end of said sleeve and a bearing by a twistable hose in a gas and liquid tight manner. In that case this sleeve need not be attached to the coupling shaft in a gas and liquid tight manner, as its both ends are situated within the hose.

The apparatus may be constructed in such a way that the coupling shaft is a horizontal shaft, which, within the vessel, is positively coupled with the bell by means of a horizontal or substantially horizontal lever arm and, outside the vessel, is provided with an oppositely directed rod-shaped cross arm and a counter-weight mounted for sliding on said cross arm. This single counter-weight must then be adjusted in correspondence with three factors, viz. with the specific weight of the lighter liquid to be separated, with the concentration of lighter liquid in the mixture of heavier liquid and lighter liquid to be separated, with the concentration of lighter liquid in the mixture of heavier liquid and lighter to be separated, and with the allowable variations of the layer of lighter liquid which is formed within the bell. In order to be able to adjust the counter-weight in the right position for the desired regulation one must define these three factors in advance.

The determination of said three factors can be facilitated, when the coupling shaft is also provided, outside the vessel with a second rod-shaped cross arm and a second weight mounted for sliding on said second cross arm, said second cross arm pointing in the same direction as the lever arm provided within the vessel. For the adjustment of the regulation one can follow the following procedure. In order to facilitate fiscing one's mind and merely as example in following description oil will be referred to as the lighter liquid and water will be referred to as the heavier liquid.

The vessel is first entirely filled with water. Then the counter-weight is, when for instance the second weight has been removed, so adjusted that the bell starts to float in the water. Thereupon so much mixture to be separated is supplied to the space within the bell, while the valve in the oil discharge conduit is kept closed and water is discharged from the vessel, that the bell is filled with mixture except in the part of said space extending from its lower edge to a certain height. Since the mixture is lighter than water the bell is pushed upwards. The counter-weight is then moved to a position at such a distance from the coupling shaft that the bell starts to float again. Thereafter the second weight which increases the weight of the bell is placed in a certain position. This second weight pushes the bell into its lowest position. The bell will only move upwards again, when a layer of oil of predetermined thickness has been separated from the mixture, so that by means of the second weight the thickness of the oil layer, at which the bell is pushed upwards and the valve in the oil discharge conduit is opened, can be adjusted.

The adjustment of the regulation can be made still simpler when provided outside the vessel is a separate auxiliary device adapted to be coupled with the coupling shaft and serving to increase the moment exerted on the coupling shaft by the bell. The counter-weight is then exclusively used for the compensation of the apparent weight of the bell in water and the second weight is then exclusively used to load the bell in correspondence with the specific weight of the mixture, that means with the specific weight of the oil and the concentration thereof in the mixture. In that case the auxiliary device serves only to adjust the range, in which the thickness of the oil layer to be formed is allowed to vary.

The auxiliary device for increasing the moment exerted on the coupling shaft by the bell may be advantageously constructed as a horizontal or substantially horizontal third rod mounted for swinging about a horizontal axis and a third weight mounted for sliding on said third rod, said third rod being coupled with the coupling shaft and being swung upwards by the latter just after the bell has left its lowest position, when moving upwards.

The use of two oppositely directed cross arms attached to the coupling shaft has the advantage that the coupling shaft is loaded substantially symmetrically, so that it rotates more easily and rocking movements of the vessel, when used on board of a ship, have less influence on the movement of the coupling shaft.

The invention will be further elucidated with the aid of the drawing. Therein is:

FIG. 1 a vertical sectional view of an apparatus for the separation of oil from a mixture of water and oil constructed in accordance with the invention, FIG. 2 on a larger scale an elevational view of the upper part of the apparatus shown in FIG. 1 and FIG. 3 a cross sectional view taken on the line III—III in FIG. 1.

In the drawing 1 is a closed vessel, in the lower part of which a filter 2 permitting only water to pass is provided. This filter divides the vessel in a lower space 3 and an upper space 4. Connected to the lower space 3 of the vessel is a water discharge conduit 5 which is provided with a valve 6 for adjusting the passage opening of said conduit. Also a normally closed discharge conduit 7 is connected to the space 3 of the vessel.

In the upper vessel space 4, to the upper end of which a dome 8 mounted on the vessel 1 and provided with a vent 10 closed by a valve 9 is connected, a bell 11 is provided which is adapted to move up and down between two positions and in its lowest position rests on stops 12 attached to the vessel. A conduit 14 for the supply of water-oil-mixture to be separated opens into the space 13 confined with the bell 11. Connected to the space 13 is also an oil discharge conduit 15, of which the inlet opening 16 is situated just under the upper wall of the bell 11, when the latter is in its lowest position. A valve 18 controlled by an electromagnet 17 is provided in the oil discharge conduit 15.

The bell 11 is suspended by a link 19 from a substantially horizontal arm 20 forming part of a bushing 21. This bushing is mounted on a horizontal coupling shaft 22 which is rotatably supported in two opposite upright walls of the dome 8 and projects outwards from the dome with its one end. Attached to the outward projecting end of the coupling shaft 22 is a T-piece 23, in which a substantially horizontal rod 24 protruding to both sides of the T-piece is mounted. Mounted for sliding on the right hand portion of the rod 24 is a counter-weight 25 and on the left hand portion thereof is a second weight 26.

In order to make the passage of the coupling shaft 22 gas and liquid tight the latter is surrounded, within the dome 8, by twistable hoses 27, 28 of gas and liquid tight material. The ends of these hoses are slipped over the ends of the bushing 21 and over inwards projecting bearing bushings 29, 30 which are attached to the walls of the dome 8 in a gas and liquid tight manner. These hoses are connected with said bushing 21 and said bearing bushings 29, 30 in a gas and liquid tight manner.

Outside the dome 8 and above the T-piece 23 carrying the rod 24 a rod 32 adapted to be swung about an axis 31 parallel to the coupling shaft 22 and a third weight 33 mounted for sliding on said rod 32 are provided. This rod 32 is kept in a horizontal position by a stop 34, so that it can only be swung upwards. The rod 32 is provided with a downwards pointing cam 35 carrying a roller 36, which in the horizontal position of the rod 32 is just clear from the T-piece 23 in the position thereof corresponding with the lowest position of the bell 11.

In its horizontal lowest position the rod 32 keeps an electrical switching contact 37 open. If the rod 32 is swung upwards by means of the coupling shaft 22 and the T-piece 23 it closes a second switching contact 38, just before the bell 11 has reached its highest position. The magnet coil 17 controls the valve 18 and a maintenance contact 39 which is closed when the magnet coil 17 is excited and the valve 18 is opened. The magnet coil 17 is connected on one hand through a conductor 40 provided with a normally closed switch 41 to one terminal 42 and on the other hand both through the series connection of the switching contact 37 and the maintenance contact 39 and through the switching contact 38 to the other terminal 43 of a voltage supply.

This apparatus operates as follows:

First the switch 41 is opened so that the electrical control of the valve 18 provided in the oil discharge conduit is put out of operation. The second weight 26 is for the moment removed. Thereupon the vessel 1 is entirely filled with water. This water may be supplied through the conduit 5 or through a separate conduit (not shown). During filling the vessel 1 the valve 9 of the vent 10 is open. As soon as the vessel has been entirely filled, the vent is closed.

Thereafter, the apparent weight of the bell 11 in water is compensated by means of the counter weight 25, so that the bell 11 starts to float. If this situation occur the water-oil-mixture to be separated is supplied to the space 13 within the bell 11, while water is discharged through the conduit 5. If the bell has become filled with mixture at a safe distance above its lower edge, the valve 6 provided in the water discharge conduit 5 is then closed for a short time, so that no mixture can be supplied any more. The mixture is lighter than water pushes the bell 11 upwards. Thereafter the second weight 26 is placed back and by means thereof the bell is brought back into balance so that the bell, apart from the clearance between the roller 36 and the T-piece 23, is kept in its lowest position by the third weight 33.

Now, the position of the third weight 33 on the rod 32 is adjusted in dependence on the specific weight of the oil and on the thickness of the layer of oil forming in the upper portion of the bell and necessary for the filling of the bell which becomes gradually lighter to push the bell upwards against the moment exerted by the weight 33 on the coupling shaft.

Thereafter the passage of mixture is adjusted by means of the valve 6 provided in the water discharge conduit 5 and the switch 41 is closed, whereupon the separation process starts.

As soon as a layer of oil of the thickness corresponding to the adjustment of the weight 33 has been formed in the bell, the contents of the bell 11 have become so light, that the bell 11 moves and the rod 32 carrying the weight 33 is swung upwards. Due thereto first the switching contact 37 is closed. As soon as the bell has reached its highest positon, the switching contact 38 is closed through the rod 32 by the bell, which results in that the magnet coil 17 is excited, the valve 18 of the oil discharge conduit 15 is opened and the maintenance contact 39 is closed. In that situation oil is discharged through the conduit 15. This results in that the bell descends and the switching contact 38 is opened again. However, these facts have no influence on the oil discharge, since thereafter the magnet coil 17 remains excited through the series connection of the switching contact 37 and the maintenance contact 39. Just before the bell 11 has reached its lowest position on the stops 12 the switching contact 37 is opened, so that the magnet coil 17 becomes currentless and the valve 18 is closed. However, since the separation process proceeds continuously, the layer of oil within the bell grows If said layer has become sufficiently thick, the bell moves upwards again and the next predetermined quantity of oil is discharged, etc. If one makes sure by means of the weight 33 that also after the discharge of oil the layer of oil is still so thick, that the boundary surface between mixture and oil remains far below the inlet opening 16 of the oil discharge conduit 15, there will be no danger that water is discharged together with the oil.

What we claim is:

1. An apparatus for the separation of oil, a heavier liquid and a lighter liquid from a mixture of the same said apparatus comprising at least a vessel, a venting member associated with said vessel, a bell mounted for vertical movement between a lowest and a highest position in said vessel, a filter which is only capable of letting heavier liquid through, said filter dividing the vessel into a chamber containing said bell and a heavier liquid discharge chamber, a conduit for the supply of mixture to be separated, said conduit opening into the space in said bell, said space being the separation space, a lighter liquid discharge conduit connected to said separation space, the inlet opening of said discharge conduit lying just below the upper wall of the bell, when the latter is in its lowest position, a heavier liquid discharge conduit connected to the heavier liquid discharge chamber, a system for controlling the discharge of lighter liquid from the separation space, said control system being provided outside the vessel, a rotatable coupling shaft extending through the wall of the vessel, said shaft being positively coupled with the bell within the vessel on one hand and being coupled with the control system outside the vessel on the other hand, at least one bearing bushing for the rotatable support of said coupling shaft, said bearing bushing being attached in a gas and liquid tight manner in a hole of the wall of the vessel and partly projecting into the vessel and at least one twistable hose of gas and liquid tight material provided in the vessel and surrounding said coupling shaft over a portion of its length, one end of said hose being slipped in a gas and liquid tight manner over said bearing bushing and the other end thereof over a portion of the coupling shaft or over a sleeve provided thereon.

2. An apparatus as claimed in claim 1, in which two bearings for the rotatable support of the coupling shaft are mounted on opposite walls of the vessel and a sleeve member which is positively coupled with the bell is provided on the shaft intermediate said bearings, said shaft being surrounded in a gas and liquid tight manner by two twistable hoses, of which each one extends between said sleeve member and a bearing.

3. An apparatus as claimed in claim 1, comprising a horizontal coupling shaft, a substantially horizontal lever arm mounted on the portion of said shaft extending inside the vessel, said lever arm positively coupling the bell and the coupling shaft, a rod-shaped cross arm attached to the portion of said shaft extending outside the vessel in a direction opposite to that of said lever arm, and a counter weight mounted for sliding on said cross arm.

4. An apparatus as claimed in claim 3 comprising a second rod-shaped cross arm and a second weight mounted for sliding on said second cross arm, which is also attached to the portion of the coupling shaft extending outside the vessel and points in the same direction as the lever arm contained in the vessel.

5. An apparatus as claimed in claim 4, in which outside the vessel a separate auxiliary device is provided which is adapted to be coupled with the coupling shaft and serves to increase the moment exerted on the coupling shaft by the bell.

6. An apparatus as claimed in claim 5, comprising a substantially horizontal third rod mounted for swinging about a horizontal axis and a third weight mounted for sliding on said third rod, said third rod and said third weight constituting together said auxiliary device and being so arranged in respect of the coupling rod as to be coupled with the bell and to increase the load exerted on the bell just after the bell has started its upwards movement from its lowest position.

* * * * *